US009357485B2

(12) United States Patent
Tolhuizen et al.

(10) Patent No.: US 9,357,485 B2
(45) Date of Patent: May 31, 2016

(54) METHOD FOR DETERMINING AN OPERATIONAL CHANNEL IN A COMMUNICATION NETWORK, ENERGY-RESTRICTED DEVICE AND PROXY DEVICE

(75) Inventors: Ludovicus Marinus Gerardus Maria Tolhuizen, Waalre (NL); Bozena Erdmann, Aachen (DE); Armand Michel Marie Lelkens, Heerlen (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 146 days.

(21) Appl. No.: 13/988,713

(22) PCT Filed: Nov. 15, 2011

(86) PCT No.: PCT/IB2011/055078
§ 371 (c)(1),
(2), (4) Date: May 21, 2013

(87) PCT Pub. No.: WO2012/069956
PCT Pub. Date: May 31, 2012

(65) Prior Publication Data
US 2013/0242840 A1 Sep. 19, 2013

(30) Foreign Application Priority Data
Nov. 26, 2010 (EP) .................................... 10192817

(51) Int. Cl.
*H04W 28/04* (2009.01)
*H04W 24/00* (2009.01)
(Continued)

(52) U.S. Cl.
CPC ...... *H04W 52/0209* (2013.01); *H04W 52/0229* (2013.01); *H04W 84/18* (2013.01); *H04W 8/005* (2013.01); *H04W 72/02* (2013.01)

(58) Field of Classification Search
CPC ....... H04W 4/08; H04W 24/03; H04W 80/04; H04W 28/04; H04W 47/10; H04W 72/04; H04W 24/00
See application file for complete search history.

(56) References Cited

U.S. PATENT DOCUMENTS

2004/0174829 A1* 9/2004 Ayyagari ....................... 370/254
2007/0214505 A1* 9/2007 Stavrou et al. .................. 726/24
(Continued)

FOREIGN PATENT DOCUMENTS

WO 2010092532 A1 8/2010

OTHER PUBLICATIONS

Han, Dae-Man et al "Design and Implementation of Smart Home Energy Management Systems based on ZigBee", IEEE Transactions on Consumer Electronics, vol. 56, No. 3, Aug. 1, 2010, pp. 1417-1425.
(Continued)

*Primary Examiner* — Andrew Lee (57) ABSTRACT

The present invention relates to a method for determining an operational channel c_op of a communication network comprising at least two potential proxies for an energy-restricted device to join the network, and a set C of radio channels, wherein an energy-restricted device is to join the network, the method comprising the following steps: —the energy-restricted device transmitting a first beacon message on a first channel $succ^{(m-1)}(c)$ in MAC broadcast, wherein c belongs to the set C, and switching to receiving mode on channel listen (c), wherein succ and listen is an arithmetical function, from C to C, and m is a positive integer, —the proxies receiving the beacon message sent on channel $succ^{(m-1)}(c)$, —the temporary master device switching its radio receiver to channel $succ^m(c)$, —the energy-restricted device transmitting a second beacon message on a second channel succ(c) and switching to receiving mode on channel listen ($succ^m(c)$), —upon receipt of the second beacon, the temporary master device transmitting a response on a channel listen listen($succ^m(c)$), 20 —the energy-restricted device receiving the beacon response on a channel listen listen($succ^m(c)$), determining that c=c_op. The invention also relates to an energy-restricted device and a proxy device therefor.

15 Claims, 4 Drawing Sheets

(51) Int. Cl.
*H04W 52/02* (2009.01)
*H04W 84/18* (2009.01)
*H04W 8/00* (2009.01)
*H04W 72/02* (2009.01)

(56) References Cited

U.S. PATENT DOCUMENTS

2008/0151856 A1* 6/2008 Glick et al. ............. 370/343
2008/0195426 A1* 8/2008 Moore ...................... 705/5
2010/0220686 A1* 9/2010 Glick et al. ............. 370/330
2011/0032912 A1* 2/2011 Cordeiro et al. ......... 370/336

OTHER PUBLICATIONS

Bader, Sebastian et al "Enabling Battery-Less Wireless Sensor Operation using Solar Energy Harvesting at Locations with Limited Solar Radiation", Sensor Technologies and Applications, Jul. 18, 2010, pp. 602-608.

* cited by examiner

METHOD FOR DETERMINING AN OPERATIONAL CHANNEL IN A COMMUNICATION NETWORK, ENERGY-RESTRICTED DEVICE AND PROXY DEVICE

FIELD OF THE INVENTION

The invention relates to the commissioning of energy-restricted devices into a network. Specifically, it relates to commissioning of ZigBee Green Power Devices (ZGPD) according to the ZigBee Green Power specification into a ZigBee network including ZGP-capable devices.

More generally, the invention relates to the way for the energy-restricted devices to determine the operational channel of the communication network they are to be joined to, for example a ZigBee network.

For application of the present invention, a ZGPD device is, for example, a batteryless wireless switch, harvesting energy from pushing and/or releasing of the rocker. This energy can be used for radio data transmission, radio data reception, or both.

Another example of ZGPD is a solar-powered sensor device, such as temperature sensor, presence/occupancy/movement sensor, humidity sensor, CO sensor, $CO_2$ sensor, light level sensor, or a multisensor being a combination of a number of sensors.

Yet another example of ZGPD is buttonpush or solar powered RC.

Yet another example is a flow-powered water or gas meter, or a power meter powered by the electro-mechanical energy radiated by the cable it is placed around.

In general, the invention is applicable to any ZGPD using energy harvesting (mechanical, solar, electro-magnetic, flow-based, etc.) with sensing, metering or control functionality.

Furthermore, the invention is also applicable to other devices implementing the ZGP specification in the ZGPD role, e.g. battery-operated devices with very limited battery size and/or very long lifetime expectation, for example a battery-powered flow meter.

Furthermore, the invention is also applicable to any energy-restricted device implemented according to any wireless technology which may support multiple channels.

Within the meaning of the present specification, the term "proxy" is used when referring to a device capable of receiving signals from a ZGPD/an energy-restricted device.

In case of the ZGPD according to the ZGP specification, it can be the ZGPP or ZGPT+ or ZGPC according to the ZigBee Green Power specification. In case of any other technology, it's the receiver as defined by this technology.

BACKGROUND OF THE INVENTION

In the commissioning phase, a ZGPD is to be joined to a ZigBee network. An essential step in the commissioning, is obtaining the radio channel on which the ZGP network is operating, called the operational channel.

In multi-hop ZigBee environments targeted for the ZGPD usage, usage of a predefined separate commissioning channel is not possible, since switching the entire ZigBee network to the commissioning channel is error-prone, cumbersome and will negatively impact sleeping ZigBee End Devices.

It is a requirement on the commissioning procedure to have a possibility of involving intermediate devices, because the ZGPD may already be installed and be out of radio range of the device it is supposed to be configured by and/or paired with (i.e. the device that it will control).

Passive or active scanning for network activity (according to IEEE 802.15.4 procedures) is too energy-costly for the ZGPD.

Other methods of channel setting, such as typing it in, entering it using DIP switches on the ZGPD, etc. are considered too complicated for the home user and require dedicated user interface and/or hardware means.

Accordingly, the present invention describes a procedure for an energy-restricted device capable of limited reception to obtain the network operational channel. The main aspect is that the energy harvested is used to send a beacon request and to receive a response. The response, however, is not the response to this current beacon request, but to a previous beacon request.

SUMMARY OF THE INVENTION

It is an object of the invention to propose a method for determining an operational channel $c\_op$ of a communication network comprising at least two potential proxies for an energy-restricted device to join the network, and a set C of radio channels, wherein an energy-restricted device is to join the network, the method comprising the following steps:

the energy-restricted device transmitting a first beacon message on a first channel $succ^{(m-1)}(c)$ in MAC broadcast, wherein c belongs to the set C, and switching to receiving mode on channel listen(c), wherein succ and listen is an arithmetical function, from C to C, and m is a positive integer, the proxies receiving the beacon message sent on channel $succ^{(m-1)}(c)$, the temporary master device switching its radio receiver to channel $succ^m(c)$, the energy-restricted device transmitting a second beacon message on a second channel succ (c) and switching to receiving mode on channel listen($succ^m(c)$), upon receipt of the second beacon, the temporary master device transmitting a response on a channel listen($succ^m(c)$), the energy-restricted device receiving the beacon response on a channel listen($succ^m(c)$), determining that $c=c\_op$.

In one specific embodiment of the method, the energy-restricted device transmitting subsequent beacon messages until beacon response is received, each beacon i on channel $succ^i(c)$ in MAC broadcast, wherein succ is an arithmetical function, from C to C, i is a non-negative integer, $succ^i$ denotes that the function succ is applied i times, such that $succ^m(c)=succ(succ^{m-1}(c))$, and switching to receiving mode on channel listen($succ^i(c)$).

the proxies receiving the beacon message on the operational channel $c\_op$ communicate on channel $c\_op$ to determine the temporary master device the temporary master device switching its radio receiver to channel $succ^m(c)$, upon receipt of the beacon on $succ^m$ (c), the temporary master device transmitting the beacon response on a channel listen($succ^m(c)$), the energy-restricted device receiving the beacon response on a channel listen($succ^m(c)$), and determining the $c\_op$.

In another embodiment, the functions listen and succ are such that there exists an integer d such that listen($succ^d(c)$)=c In another embodiment, the functions listen and succ and the integer d are such that listen($succ^d(c)$)=c, and the parameter m is fixed to m=d so that the energy-restricted device receives the beacon response on the operational channel.

In another embodiment, the function listen is such that listen(c)=c, so that the energy-resource restricted device does not need to switch to a different radio channel for receiving signals.

In another embodiment, the function listen is a constant function, so that the energy-restricted device always listens to the same channel.

In another embodiment, the function succ is comprised in the group comprising: incrementing by one and wrapping over in C, decrementing by one and rolling over in C, an (recurring) ordered set, any other function comprising an incrementing or decrementing feature on C, incrementing on part of C and decrementing on other part of C, and a non-monotonic function.

In another embodiment, the energy-restricted device sends at least channels, before listening.

In another embodiment, the functions succ and/or listen are known both by the energy-restricted device and the proxies.

In another embodiment, the function succ and/or listen are not known by the proxies, and wherein the beacon transmitted by the energy-restricted device comprise information allowing the proxy to determine the relevant functions of succ and listen.

In another embodiment, the parameter m is fixed by specification or at the production of the ZGPD.

In another embodiment, the parameter m be can chosen, taking into account networking phenomena comprising: traffic load on the medium, traffic load on the device, distance in hop count, processing speed on the device.

In another embodiment, the determining of the temporary master device is performed according to the procedure specified in ZigBee Green Power specification, involving a sink device, to be paired to the energy restricted device.

In another embodiment, the determining of the temporary master device is performed according to any distributed or centralized algorithm.

In another embodiment, TV suitable temporary master devices are appointed during the determining procedure, wherein N is an integer larger than 1 and each of them to listen to a different channel.

In another embodiment, beacon and beacon response frames only contain information for finding the operational channel c_op, and wherein exchange of configuration parameters takes place upon finding the c_op.

In another embodiment, beacon and/or beacon response frames contain the required configuration parameters and wherein upon finding the c_op no further commissioning exchange is required.

In another embodiment, the energy used for transmitting beacons, receiving beacon responses and the required processing is harvested in the energy-restricted device from a mechanical action performed by a user on the device.

In another embodiment, the energy used for transmitting beacons, receiving beacon responses and the required processing is harvested in the energy-restricted device autonomously.

The invention also relates to an energy-restricted device comprising means for carrying out a method according to the invention. This device is, for example, a ZigBee Green Power Device.

The invention also relates to a proxy device comprising means for carrying out a method according to the invention. The proxy device is, for example, a ZigBee Green Power Proxy device or a ZigBee Green Power Combo device.

These and other aspects of the invention will be apparent from and will be elucidated with reference to the embodiments described hereinafter.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION OF THE INVENTION

The invention takes place in a communication network comprising at least two proxy devices, operating on the operational channel. At least one ZigBee Green Power device (ZGPD), capable of operating on any channel from a set of channels, is to be added to the network. This requires it to find the operational channel.

To this end, the ZGPD transmits several beacon messages ("Beacon"), on different radio channels and listens for a response to its beacon message ("Beacon response").

Depending on the ZGPD device type and capabilities, there may be different ways to make the ZGPD send the beacon frame. There can be special means for putting the device in the commissioning mode, e.g. a dedicated button, slider, jumper, etc. There may be special action required, such as particular order of steps. There may be a particular combination of means individually usable in the operation mode, e.g. simultaneously pressing a number of RC keys or combination of contacts on a switch which cannot be used during operation (e.g. both contacts under the same rocker).

The action can enable the commissioning mode or be required for each sending of the Beacon.

The action may be combined with energy harvesting (e.g. for the switch harvesting the energy from being pushed) or may be independent (e.g. for a solar powered device). It may be an explicit step (like pushing the commissioning button) or an implicit step (e.g. when first powering a battery-powered device).

There may be different approaches to time spacing between beacon transmissions. E.g. it may be fixed, random, configurable, influenced by the device limitations (such as time required for channel switching or switch between transmission and reception modes), by the user action, by timer, by another function, by the amount of energy harvested, etc.

As beacon messages are sent in MAC broadcast, multiple proxies may send a beacon response. Since it is possible that these proxies are beyond radio range of each other, their response messages may collide at the ZGPD of, so that the ZGPD does not properly receive a beacon response. The problem is known in the art as the hidden-node problem. However, the known in the art solutions to this problem are not readily applicable to the energy-restricted device, because it may not have the energy to retry several times or receive much delayed transmission. A mechanism for making sure that only one proxy sends a response to the energy-harvesting device, and thus that beacon response message is properly received, is known in the ZGP standard [1, Sec. 6.3 and A.3.6.2.3]. The time for executing this mechanism, however, is likely to be much longer than the time during which the ZGPD can store harvested energy, so that the ZGPD cannot reliably receive a response to a beacon with the same button press used for transmitting that beacon.

It is thus the aim of the invention is to provide a method for the ZGPD to determine c_op, the radio channel on which the channel is actually operating.

To describe the invention accurately, we introduce the following notation. The ZGPD can transmit and receive on a finite set C of radio channels. The radio channel on which the network is actually operating, denoted by c_op, is preferably contained in C.

The set of channels C can be a complete set of channels supported by a given technology and band and region. E.g. for the ZGPD operating in the 2.4 GHz band, C could include all the IEEE802.15.4 channels 11-25 (26). This provides full interoperability with the receiving devices implementing this particular technology, but may increase the length and complexity (depending how sending of the beacon is triggered) of the commissioning procedure. The set of channels C can also contain a selected subset of all available channels. For example, the ZGP specification recommends to use the following 4 channels: 11, 15, 20, 25; the last three are between the non-overlapping channels used by the 802.11 standard operating in the same 2.4 GHz band; channel 11 is the default channel in many platform implementations.

Furthermore, the ZGPD knows two functions, succ and listen, both from C to C, that is both functions accept inputs from C and produce outputs in C. The function succ describes the order in which the ZGPD steps through channels for transmitting its beacons. After sending on channel c, the ZGPD will send on channel succ(c) on the next button press, or, more generally, on the next attempt to find the operational channel. For non-negative integer m, we denote by $succ^m$ the function succ applied m times. So $succ^0(c)=c$, and for $m \geq 1$, $succ^m(c)=succ(succ^{m-1}(c))$.

The succ function, describing the order in which the ZGPD steps through channels for transmitting its beacons, can be any function: incrementing by one with/without wrapping around, decrementing by one with/without wrapping around, following a different incremental function, random, non-monotonic function, recurring or non-recurring ordered set, etc. They can further be ordered such that channel from C that is likely to be the operational channel can be tried first. For example, the full channel set may be ordered such that it starts with the recommended/preferred channel set or from the previous operational channel (if any).

The three parameters—the set C as well as the functions succ and listen—can be predetermined in a specification and hence be known to all devices in the network. There could one definition included in the specification, thus not requiring the ZGPD to include this information explicitly in the beacon or. There could be several alternatives defined in the specification, encoded on a flag or an enumeration field (one for all three parameters) or a number of 2-3 flags/enumeration fields for parameter combinations or each parameter individually. Those should then preferably be included in the beacon (communicated otherwise, e.g. by a product information, requiring potentially different user interaction or commissioning mode on the network side).

The determination of the ZGPD channel switching behavior may be out-of-scope of the specification and left up to the implementers. Then, all/some/parts of the parameters should explicitly be transmitted in the beacon. For example, the ZGPD can include in the beacon the full list of channels C, or the next N channels, where N can be 1. The ZGPD can include the function formula for succ and listen.

Any combination of the above is also possible.

According to the invention, for each instance of this attempt of determining the operational channel (thereafter referred to as "attempt") the ZGPD uses the energy available (e.g. harvested during a button press in case of electro-mechanical buttonpush switch or e.g. in case of solar-powered switch remaining after the previous attempt and harvested since) to perform the steps comprising:

sending a beacon to the network on radio channel c receiving, on radio channel listen(c), a response to the beacon sent during any previous attempt, if any such beacon response is sent calculate the succ function store succ-related state information The order of the operations and the number of particular operations in each step can vary. Some examples are described in the embodiments below.

All proxies operate on the operational channel and hence receive no beacon if $c \neq c\_op$. If $c = c\_op$, one or more proxies receive the beacon, and a mechanism for selecting a unique "temporary master" that will send a beacon response is applied Preferably the ZGP-described mechanism (as described in [1], sec 6.3 and A.3.6.2.3), involving the device to be paired with the ZGPD (the so-called ZigBee Green Power Sink (ZGPS) set into commissioning mode) in the process of electing the temporary master with the shortest distance to the ZGPD, will be used. Alternatively, any other protocol/mechanism allowing for selecting one (if possible: taking additional criteria into account, like distance/signal strength) device for a group of devices, whether the mechanism is distributed or centralized, can be applied.

This temporary master is responsible for sending the beacon response to the energy-restricted device, does not transmit the beacon response immediately. Instead, the temporary master switches its radio receiver to channel $succ^m(c\_op)$ (where m is a positive integer), the channel on which the ZGPD will send (one of) its next beacon(s). When the temporary master hears this next beacon on the channel $succ^m(c\_op)$, it transmits the beacon response on channel listen($succ^m(c\_op)$); note that this is the channel the ZGPD listens to while sending on channel $succ^m(c\_op)$. The beacon response can be pre-computed and fetched from the buffer at the reception of the beacon message or it can be computed at the reception of the beacon message.

Note that the temporary master need not know m: it must know the function value $succ^m(c\_op)$, and know that if it receives the next beacon on channel x, it has to send the beacon response on channel listen(x). Having the value m relaxes the constraint on the minimum time between two successive button presses, but also makes longer the time for completing the procedure. For some embodiments, the parameter m must have a fixed value (equal to 1 or larger than 1), defined by specification or defined and communicated per energy-harvesting device or; in other embodiments, m may vary (e.g. depending on the traffic load, distance (e.g. in hop counts) between the ZGPD and the device it is paired to, the density of proxies, etc.). If m can vary, then it can be chosen as part of the temporary master election procedure (in case of the ZGP specification: by the ZGPS in commissioning mode); or by the temporary master itself. It shall be clear to the temporary master proxy (or ZGPS, if ZGP temporary master election procedure is used and the channel is prescribed as part of that) when it is free to choose m and when it is fixed. That can be handled by specification or case by case.

Preferably, the time between two successive button presses is sufficiently long to allow for selection of the temporary master, i.e. m=1. Depending on the device type, it could be influenced by setting the internal parameter of the ZGPD and/or instructing the user to adapt the time interval between the user action (e.g. in the case of energy-harvesting electromagnetic switch buttonpush).

In a first and second embodiment, succ and listen are such that listen($succ^d(c)$)=c for all c in C, whereby d is non-negative integer.

For each attempt, the ZGPD thus transmits and receives on different radio channels, viz. radio channels c and listen(c), respectively, whereby the channel it listens on is the channel it transmitted on in the previous attempt. Also, the temporary master sends on a radio channel (viz. listen($succ^d(c\_op)$)) that is different from the one on which it received the trigger for sending the response (channel $succ^d(c\_op)$).

In the first embodiment, the value of m is thus fixed to m=d, by the ZGPD or by specification. The advantage of this embodiment is that the ZGPD receives the beacon response on the operational channel c_op and hence need not switch channels anymore, or be explicitly informed about the value of c_op. If the device stores the channel it listens to in each given attempt, it's equal to the c_op, so it doesn't need to be stored anymore. If the device stored the channel it sends on, it can calculate the c_op as reverse of the succ(c) function and must store it. The value of $succ^m(c\_op)$ must be known to the temporary master, either by the presence of the value of $succ^m(c)$ in the beacon sent on channel c, or by knowledge of the function succ(c) in a specification and knowledge of m, or by knowledge of the function succ(c) and function listen(c), either in a specification or present in the beacon. The temporary master also must know it should send on c_op, either because this is prescribed in the specification, or by knowledge of the function listen, either from specification or presence in the beacon.

In the second embodiment, the value m can vary. The temporary master thus listens on any channel $succ^m(c\_op)$ and upon receiving the beacon sends on radio channel listen ($succ^m(c\_op)$). Then, the operational channel must be transmitted in the beacon response and stored by the ZGPD.

In a third, fourth and fifth embodiment, listen(c)=c for all c in C. In this case, with the energy harvested from one button press, the ZGPD thus transmits and receives on the same radio channel, and the temporary master transmits on the channel on which it received the trigger for sending the beacon response (namely channel $succ^m(c\_op)$).

In the third embodiment, the value of m is fixed, by the ZGPD or by specification. The ZGPD code for handling the attempts is such that the ZGPD stores the value c of the channel on which the ZGPD transmitted in the m previous attempts (and not the value to be used in the current attempt $succ^m(c)$). Thus, the ZGPD has available the values of c_op, succ(c_op), . . . , $succ^{m-1}(c\_op)$ when receiving the beacon response and hence need not store it again or be explicitly informed about the value of c_op. (the oldest of the m stored values is the value to take for c_op). Alternatively, the temporary master applies the inverse of the successor function m times to the channel on which it received the beacon.

In the fourth embodiment, the ZGPD only stores the value of the current value of c, and temporary master transmits the beacon response whenever the ZGPD transmits the beacon on c_op again.

In the fifth embodiment, the value of m can vary. In this embodiment, the value of c_op is included in the beacon response message. The ZGPD thus need not store the m values as in the second embodiment; it even does not need to know the value of m. All that is required is that the temporary master, after receiving a second beacon, say on channel x, transmits its beacon response on channel listen(x). (=x in this case).

In a sixth, and seventh embodiment, the ZGPD always listens on the same channel, that is, listen(c)=k for all c in C and some fixed k in C. The value of k may be known as it is fixed in a specification, or it may be included in the beacon.

In the sixth embodiment the value of m is fixed, by the ZGPD or by specification. The ZGPD obtains the value of c_op from its memory (similar to third embodiment).

In the seventh embodiment, the value of m can vary. In this embodiment, the value of c_op is included in the beacon response message, and thus need not be remembered by the ZGPD. Note that in the seventh embodiment, ZGPD does not need to know the value of m; all that is required, is that the temporary master, after receiving a beacon, say on channel x, transmits its beacon response on channel listen(x) (=k in this case)

Upon a successful attempt, the ZGPD shall not step through the channels anymore.

It could be implemented by e.g. having a state variable controlling this channel step behavior. It could be e.g. a Boolean value step_channel (TRUE/FALSE), set when entering operational mode and cleared on reception of the beacon response.

After that, a real commissioning exchange may follow. Alternatively, all the required configuration parameters could be delivered to the ZGPD in the beacon response.

In the $2^{nd}$ alternative, the configuration data is included in the beacon response, also—to allow for some initial checks on the network side—some information about the ZGPD need to be included in the beacon (e.g. unique device identified (in ZGPD: the SrcID), device type (in ZGP: the DeviceID), security capabilities, security key, requested parameters); while in the case of the real commissioning exchange, an additional step for exchanging configuration data (requesting and/or receiving) is required.

The $1^{st}$ method has several advantages as well, which makes it the preferred option: firstly, with the $2^{nd}$ alternative, the configuration parameter sent by the ZGPD (which may include its security credentials) are transmitted on several channels (in step 1), thus greatly increasing for them the probability of getting compromised;

secondly, the beacon and beacon response messages can be much shorter when dedicated commissioning exchange is used after finding the operational channel—which may allow for sending of multiple beacon messages with one button press. Conversely, with certain ZGPDs, the amount of harvested energy may be too small to send a long beacon and receive a long beacon response.

The commissioning exchange can be performed on the channel on which the temp master successfully sent the beacon response (i.e., channel listen($succ^m(c\_op)$).) Preferably however, the commissioning exchange will happen on the actual operational channel, to limit the time the temporary master proxy is not present on the operational channel (prolonged absence of a device on the operational may force its ZED children to search for a new parent and its neighbor router to drop the routes going via this device).

The commissioning exchange—in case of a device requiring user action for each action of the ZGPD (such as energy-harvesting electro-magnetic pushbutton switch)—can be a different action as for triggering the attempts. Preferably, however, it is the same action.

Once all commissioning-related exchanges are finished, preferably success feedback is given to the user and ZGPD can enter operational mode (device specific, see above the description of entering the commissioning mode).

Extensions
    To increase the robustness of the joining process in cases of propagation problems or interference. If there are several candidate proxy devices around the ZGPD, a number N>1 "temporary master" proxies can be appointed, each on a different channel c_k, selected from the set of channels supported by the ZGPD, C. If temporary master k ($1 \leq k \leq N$) hears a beacon on channel c_k, it sends a beacon response on channel listen(c_k). Preferably, the channels $c\_1, \ldots, c\_n$ are selected such that the ZGPD transmits on them soon after the proxies received the (first) beacon. If the function succ is known, a preferred choice for channel c_j is $succ^{j+s}(c\_op)$, where s is a fixed integer, for example s=0, and j=1,2, ..., N (note that the beacon was received on c_op). The value of c_op is included in the beacon response, i.e. embodiments 2, 5 and 7 can be used. For application of embodiment 7, it is required that no two masters send simultaneously, which surely is the case if each master listens on a different channel the ZGPD does not transmit on different channels c_i and c_j (with $1 \leq i \leq N$, $1 \leq j \leq N$) before the same listening attempt.
    It should be made clear to each of the multiple temporary masters that they cannot choose the channel to listen to freely.
    Note that some of the appointed temporary master proxies may not receive any beacon anymore. They should be able to exit commissioning mode, e.g. after a timeout, as known in the art.
    The ZGPD may harvest sufficient energy to send multiple beacon messages during one attempt. The same method as above can be applied, with some minor modifications, as described in the following exemplary embodiments:
        For each attempt, the ZGPD performs multiple times the sequence of actions: send on a channel c, switch to receiving mode, receive on listen(c); in case no beacon response is received: and repeat the sequence. Somewhere during the sequence, the next channel to transmit on will be determined via succ(c) and some corresponding state information stored; that can be done before sending, after sending, before entering receive mode, on determining receive failure (e.g. reception timeout) or at any other moment, as would be obvious to those skilled in the art.
        How many times the sequence is performed may vary. For example, it can be fixed, per product, device type or ZGP specification, may very dependent on the amount of available (harvested) energy or dependent on the type of user interaction.
        For each attempt, the ZGPD first transmits the beacon on N channels, and then listens. Thus, for all the channels transmitted on in each particular attempt, the listen(c) has the same value. This can be indicated in the beacon or predefined, as described before.
    In this case, the temporary master can listen for a next beacon at any of the channels in the next attempt (assuming m=1). One choice would be that the temporary master listens to the final channel on which transmission takes place in the next attempt. This channel can either be included in the beacon, or (via a modified version of the succ function known in the specification) be derived from the channel c_op on which the beacon was received.

Exemplary Complete Commissioning Procedure
    Above, we described a method for allowing the ZGPD to find the operational channel of the ZigBee network, an essential step in the commissioning of the ZGPD. Below, we describe two exemplary ways of commissioning using the above method within the scope of the ZGP specification [1], for the ZGPD and ZGPP and ZGPS as defined in ZG.

Figure 1:
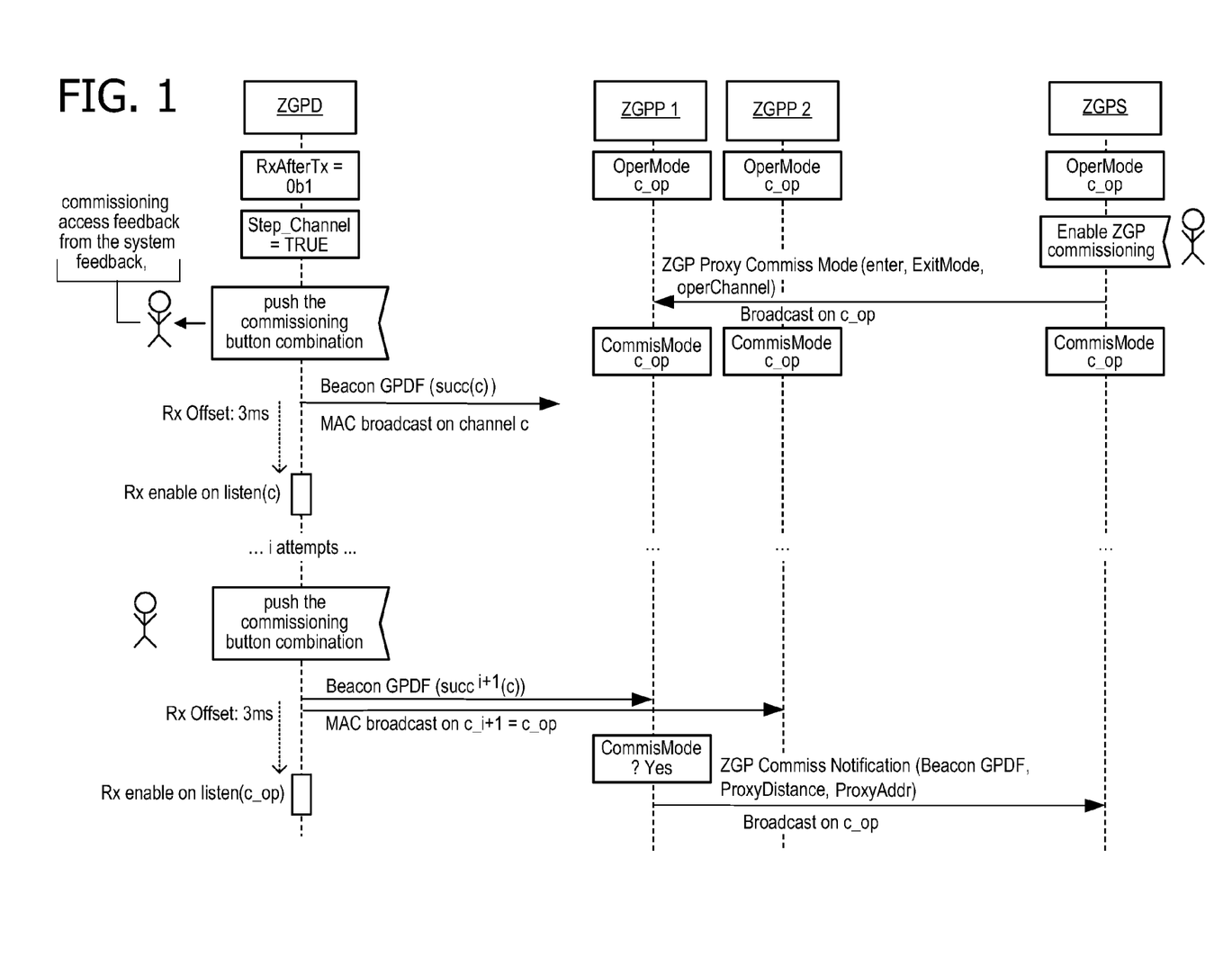
FIG. 1 illustrates a method of determining an operational channel in a communication network in accordance with the principles of the invention.

$1^{st}$ Commissioning Method: Short Beacons
1. ZGPS (the device to be controlled by and paired to the ZGPD) is put in commissioning mode by user action. It remains on the operational channel.
2. ZGPS announces the commissioning mode to all the ZGP-capable devices in the ZigBee network. They enter commissioning mode on the operational channel.
3. ZGPD sends a short beacon, possibly not even carrying an identifier of the ZGPD, but possibly containing the information regarding its future channel stepping behavior (if not uniquely prescribed by the ZGP specification), on a channel c, and then listens on a channel listen (c).
4. The ZGPD transmitting subsequent beacon messages until beacon response is received, each beacon i on channel $succ^i(c)$ and listens on a channel $listen(succ^i(c))$.
5. The proxy reports reception on operational channel of the beacon (and its contents) to the ZGPS.
6. The ZGPS checks if it is in commissioning mode and, if so, appoints the temporary master(s) to handle the communication from this ZGPD during commissioning (if multiple, also indicating on which channel which proxy shall transmit).
7. The appointed temporary master(s) enables its receiver on (a) selected channel(s) c on which to the ZGPD will send in the future, (if multiple: as indicated by the ZGPS; if one: if not indicated by the ZGPD and not defined by profile/ZGPD/method, then can be chosen by the master itself).
8. An appointed temporary master receives beacon on the channel c and sends beacon response, indicating reception of the beacon, and optionally (embodiments 2, 5 and 7) including the operational channel c_op.
9. The ZGPD receives the beacon request, opt. stores the operational channel and stores the state information, that the operational channel is found (in the figure, the Boolean step_channel=FALSE).
10. The ZGPD and temporary master go back to the operational channel (if c!=c_op).
11. ZGPD and the ZGPS exchange (via (one of) the temporary master(s)) the configuration data.
12. Commissioning success, ZGPS and ZGPP can exit commissioning mode.

Figure 2:
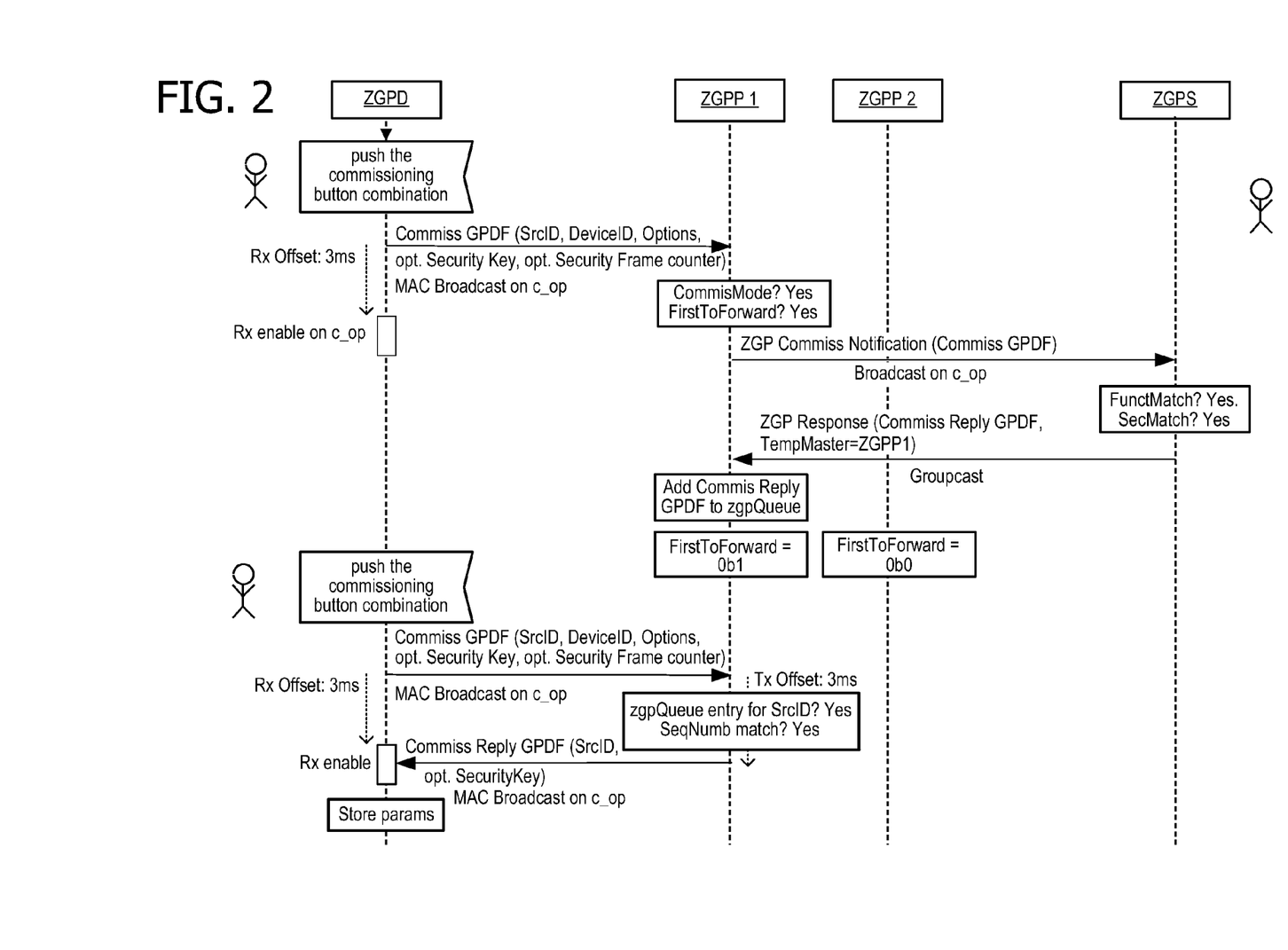
FIG. 2 illustrates a second method of determining an operational channel in a communication network in accordance with the principles of the invention.

$2^{nd}$ Commissioning Method: Long Beacons.
1. ZGPS (the device to be controlled by and paired to the ZGPD) is put in commissioning mode by user action. It remains on the operational channel.
2. ZGPS announces the commissioning mode to all the ZGP-capable devices in the ZigBee network. They enter commissioning mode on the operational channel.
3. The ZGPD sends a long beacon, including device type (ZGPD DeviceID), supported security level and other device capabilities, its identifier (ZGPD SrcID), opt. security key, and opt. security frame counter, and the information regarding its future channel stepping behavior (if not uniquely prescribed by the ZGP specification), on a channel c, and then listens on a channel listen (c).
4. The ZGPD transmitting subsequent beacon messages until beacon response is received, each beacon i on channel succ(c) and listens on a channel listen(succ(c)).
5. The proxy reports reception on operational channel of the beacon (and its contents) to the ZGPS.
6. The ZGPS checks if it is in commissioning mode. If so, The ZGPS performs functionality, security level matching etc. If all requirements match, the ZGPS appoints the temporary master(s) to deliver the required configuration parameters to the ZGPD.
7. The temporary master(s) listen on (a different) channel(s) c, on which to the ZGPD will send in the future.
8. Upon reception of beacon on channel c, the temporary master send beacon response on channel listen(c), indicating reception of the beacon, and containing the configuration data (if required/requested) and optionally (embodiments 2, 5 and 7) the operational channel.
9. The ZGPD receives the beacon request, opt. stores the operational channel, stores the state information, that the operational channel is found (in the figure, the Boolean step_channel=FALSE), and stores the supplied configuration parameters if any.
10. Commissioning success, ZGPS and ZGPP can exit commissioning mode.

The invention claimed is:

1. Method for determining an operational radio channel out of a set C of radio channels, of a communication network, said communication network comprising at least two potential proxies for an energy-restricted device to join the network, the method comprising the following steps:
attempting, by the energy restricted device, to join the network,
transmitting in MAC broadcast, by the energy-restricted device for each attempt, a beacon message on a channel $c_i$ of the set C, and switches to receiving mode on channel listen(c), wherein listen is an arithmetical function, from C to C, wherein the next channel on which the energy-restricted device will transmit the next beacon message for the next attempt i+1 is $c_{i+1}=\text{succ}(c_i)$, wherein succ is arithmetical function, from C to C;
receiving, by at least one of the proxies, a first beacon message sent on the operational radio channel c_op, the proxies determining at least one temporary master device among the set of proxies,
switching the temporary master device's radio receiver to channel $\text{succ}^m(\text{c\_op})$, m being a non-zero positive integer; wherein $\text{succ}^m$ denotes that the function succ is applied m times, such that $\text{succ}^m(c)=\text{succ}(\text{succ}^{m-1}(c))$,
transmitting, by the energy-restricted device, a further beacon message on radio channel $\text{succ}^m(\text{c\_op})$ and switching to receiving mode on channel $\text{listen}(\text{succ}^m(\text{c\_op}))$,
receiving, by the temporary master device, a receipt of the further beacon message, and transmitting by the temporary master device a response on a channel $\text{listen}(\text{succ}^m(\text{c\_op}))$,
receiving, by the energy-restricted device, the beacon response on a channel $\text{listen}(\text{succ}^m(\text{c\_op}))$, determining that c_op is the operational channel.

2. Method according to claim 1, wherein m equals 1.

3. Method according to claim 1, wherein the functions listen and succ are such that there exists an integer d such that $\text{listen}(\text{succ}^d(c))=c$.

4. Method according to claim 1, wherein the parameter m is fixed to m=d so that the energy-restricted device receives the beacon response on the operational channel.

5. Method according to claim 1, wherein the function listen is such that listen(c)=c, so that the energy-resource restricted device does not need to switch to a different radio channel for receiving signals.

6. Method according to claim 1, wherein the function listen is a constant function, so that the energy-restricted device always listens to the same channel.

7. Method according to claim 1, wherein the function succ is comprised in the group comprising: incrementing by one and wrapping over in C, decrementing by one and rolling over in C, an (recurring) ordered set, any other function comprising an incrementing or decrementing feature on C, incrementing on part of C and decrementing on other part of C, and a non-monotonic function.

8. Method according to claim 1, wherein the functions succ and/or listen are known both by the energy-restricted device and the proxies.

9. Method according to claim 1, wherein the function succ and/or listen are not known by the proxies, and wherein the beacon transmitted by the energy-restricted device comprise information allowing the proxy to determine the relevant functions of succ and listen.

10. Method according to claim 1, wherein the parameter m is fixed by specification or at the production of the ZGPD.

11. Method according to claim 1, further including the step of choosing the parameter m taking into account networking phenomena comprising: traffic load on the medium, traffic load on the device, distance in hop count, processing speed on the device.

12. Method according to claim 1, wherein N suitable temporary master devices are appointed during the determining procedure, wherein N is an integer larger than 1 and each of them to listen to a different channel.

13. Energy-restricted device for determining an operational radio channel out of a set C of radio channels, of a communication network, said communication network comprising at least two potential proxies for an energy-restricted device to join the network, the energy-restricted device comprising:
a processor to attempt joining the network, transmit in MAC broadcast for each attempt, a beacon message on a channel $c_i$ of the set C, and switches to receiving mode on channel listen(c), wherein listen is an arithmetical function, from C to C, wherein the next channel on which the energy-restricted device will transmit the next beacon message for the next attempt i+1 is $c_{i+1}=\text{succ}(c_i)$, wherein succ is arithmetical function, from C to C; receive, by at least one of the proxies, a first beacon message sent on the operational radio channel c_op, the proxies determining at least one temporary master device among the set of proxies, switch the temporary master device's radio receiver to channel $\text{succ}^m(\text{c\_op})$, m being a non-zero positive integer; wherein $\text{succ}^m$ denotes that the function succ is applied m times, such that $\text{succ}^m(c)=\text{succ}(\text{succ}^{m-1}(c))$, transmit a further beacon message on radio channel $\text{succ}^m(\text{c\_op})$ and switch to a receive mode on channel $\text{listen}(\text{succ}^m(\text{c\_op}))$, and receive a beacon response, from their temporary master device, on a channel $\text{listen}(\text{succ}^m(\text{c\_op}))$, determining that c_op is the operational channel.

14. Energy-restricted device according to claim 13, wherein the energy-restricted device is a ZigBee Green Power Device.

15. A proxy device
adapted for operating on an operational radio channel c_op out of a set C of radio channels in a communication network, said network comprising at least one further potential proxy node for an energy-restricted device to join the network,
the proxy node including a receiver for receiving a beacon message from the energy-restricted device sent on channel c_op and a processor to select a temporary master device among the set of proxies and switch its radio receiver to channel $\text{succ}^m(\text{c\_op})$, in case the proxy node is selected as the temporary master device, m being a positive integer, wherein succm denotes that the function succ is applied m times such that $succ(succ^{m-1}(c))=succ^m(c)$, upon the receiver receives the further beacon message on $succ^m(c\_op)$, the temporary master device transmitting a response on a channel $listen(succ^m(c\_op))$.

* * * * *